(12) United States Patent
Shields

(10) Patent No.: US 9,483,640 B2
(45) Date of Patent: Nov. 1, 2016

(54) SYSTEM AND METHOD FOR DETERRING MALICIOUS NETWORK ATTACKS

(71) Applicant: GEORGETOWN UNIVERSITY, Washington, DC (US)

(72) Inventor: Thomas Clay Shields, Potomac, MD (US)

(73) Assignee: Georgetown University, Washington, DC (US)

( * ) Notice: Subject to any disclaimer, the term of this patent is extended or adjusted under 35 U.S.C. 154(b) by 72 days.

(21) Appl. No.: 14/242,235

(22) Filed: Apr. 1, 2014

(65) Prior Publication Data
US 2015/0281273 A1 Oct. 1, 2015

(51) Int. Cl.
*H04L 29/06* (2006.01)
*G06F 21/55* (2013.01)

(52) U.S. Cl.
CPC ......... *G06F 21/552* (2013.01); *H04L 63/1408* (2013.01); *H04L 63/1441* (2013.01)

(58) Field of Classification Search
CPC .................................................. H04L 63/1466
See application file for complete search history.

(56) References Cited

U.S. PATENT DOCUMENTS

| | | | | | |
|---|---|---|---|---|---|
| 4,363,095 A | * | 12/1982 | Woods | ................ | G06F 12/0851 711/206 |
| 5,384,848 A | * | 1/1995 | Kikuchi | ................... | H04L 9/12 380/262 |
| 6,161,183 A | * | 12/2000 | Saito | ....................... | G06F 21/10 380/282 |
| 8,165,296 B2 | * | 4/2012 | Smith | ................ | H04B 7/18589 380/255 |
| 2007/0192619 A1 | * | 8/2007 | Gifford | .................. | G06F 21/32 713/185 |
| 2008/0065902 A1 | * | 3/2008 | Spohrer | ............. | H04L 63/0428 713/193 |
| 2010/0257372 A1 | * | 10/2010 | Seifert | ................ | G06F 21/6218 713/189 |
| 2012/0047371 A1 | * | 2/2012 | Woodall | .................. | G06F 21/76 713/189 |

OTHER PUBLICATIONS

Wheeler, David J. "A bulk data encryption algorithm." Fast Software Encryption. Springer Berlin Heidelberg, 1993.*
Kissel, Zachary A. "Obfuscation of the standard XOR Encryption algorithm." Crossroads 11.3 (2005): 6-6.*

* cited by examiner

*Primary Examiner* — Shawnchoy Rahman
(74) *Attorney, Agent, or Firm* — Klarquist Sparkman, LLP

(57) ABSTRACT

A system and method for deterring malicious network attacks. The system and method is configured to execute instructions on at least one of the processors to generate a plurality of random blocks of data; generate a first XOR result by using the XOR function with the plurality of random blocks of data as the XOR function inputs; generate a tail value by using the XOR function with the first XOR result and a random encryption key as the XOR function inputs; encrypt a designated file using the random encryption key; write the plurality of random blocks and tail value to at least one storage medium; and write the encrypted designated file to at least one storage medium.

30 Claims, 9 Drawing Sheets

SYSTEM AND METHOD FOR DETERRING MALICIOUS NETWORK ATTACKS

BACKGROUND

Despite the massive amount of investment in computer security, conventional computer security systems regularly fail to prevent the capture of sensitive data. This failure can be attributed to software flaws in conventional security system designs and the evolving techniques used by unauthorized users, also known as malicious hackers. Recent techniques used by malicious hackers to gain access to computer systems include social engineering scams and "spear phishing" techniques, as well as technical means. Both social engineering and spear phishing attempt to bypass even the most secure security software by manipulating authorized users to unintentionally divulge their access credentials to secure computer networks.

After a hacker has successfully gained access credentials, the hackers can enter the previously-secure computer network using the stolen access credentials. Once inside the network, hackers can seek out and steal sensitive data by transferring the data out over the network to a private computer system. Storing the stolen data on a computer system separate from the compromised network allows unauthorized users time to sift through the data without worrying about being detected on the compromised computer network that held the stolen data.

Before a hacker can digest stolen data on a separate system, the hacker must go through the process of transferring the data out of the compromised network. In many networks, a network file server is used as a central repository for important files. In exfiltrating data, a hacker may attempt to access as many files on the network's file server as possible—potentially all of them. These access attempts will be made rapidly so that the data contained in the files can be exfiltrated by the hacker before the hacker's breach is discovered and administrators on the compromised network can terminate the hacker's access to the system. Thus, a hacker that enters a compromised network to steal data might access many files in a short period of time.

The rapid access patterns of such a hacker can be readily distinguished from the access patterns of a normal user on a network. A normal user will usually only access a few files a day to work with. Additionally, a normal user will typically wait a longer time between accessing new files than a hacker will to work with the files on the system. It may be possible to limit the activities hackers by monitoring a network for rapid access patterns from users and reacting to them when found.

However, the rapid access patterns of a hacker are not easily distinguished from the access patterns of system administrators. System administrators that oversee computer systems ensure their continued operation by backing up the data contained in the system. To do so, system administrators need to access all the files on a system quickly to continuously back up the files in ease of technical failure. Because of this, computer security systems cannot be configured to target users based on rapid access patterns. There is a need in the art for a mechanism to distinguish between authorized administrator actions that are comprised of rapid access pattern and the rapid access patterns of hackers.

BRIEF SUMMARY OF THE EMBODIMENTS

A major goal in the field of computer science is system efficiency. Computer systems and programs are designed to increase the speed by which tasks are processed. However, the increases in system efficiency have also made it easier for hackers to enter compromised systems and quickly remove sensitive data.

Conventional computer security systems attempt to determine the presence of unauthorized users by monitoring access patterns throughout the system. However, if these security systems are implemented in software, they can be thwarted by hackers that gain access to the system and remove the software-based security features. There is a need for a computer security system that can deter malicious network attacks by using the physical bottlenecks in computer hardware to slow a hacker's attacks or stop hackers from removing sensitive data altogether.

The invention is illustrated particularly in connection with embodiments related to file servers, but it is not limited to such embodiments.

One embodiment is directed to a method for deterring malicious network attacks. The method comprises: executing instructions on at least one of the processors to generate a plurality of random blocks of data; generating a first XOR result by using an "exclusive or" function ("XOR" function) with the plurality of random blocks of data as the XOR function inputs; generating a second XOR result by using the XOR function with a designated data file and the first XOR result as the XOR function inputs; and writing the plurality of random blocks and second XOR result to at least one storage medium.

According to another embodiment, the method further comprises the step of recovering the designated tile by using the XOR function with the second XOR result and the plurality of random blocks as the XOR function inputs.

Another embodiment is directed to a method for deterring malicious network attacks. The method comprises: executing instructions on at least one of the processors to generate a plurality of random blocks of data; generating a first XOR result by using the XOR function with the plurality of random blocks of data as the XOR function inputs; generating a tail value by using the XOR function with the first XOR result and a random encryption key as the XOR function inputs; encrypting a designated file using the random encryption key; writing the plurality of random blocks and tail value to at least one storage medium; and writing the encrypted designated file to at least one storage medium.

According to an embodiment, the method further comprises the steps of recovering the random encryption key by using the XOR function with the tail value and the plurality of random blocks as the XOR function inputs; and decrypting the designated file using the recovered random encryption key.

According to another embodiment, the random encryption key uses 256 bit AES security protocol.

According to another embodiment, the method further comprises the step of encrypting the random encryption key with a public key, wherein the public key has a corresponding private key and the corresponding private key is held by an administrator account.

According to another embodiment, access to the private key is based on physical presence at the system.

According to another embodiment, physical presence is authenticated by direct console access, a hardware token, or a USB stick that contains the private key.

According to another embodiment, the method further comprises the step of storing at least one random encryption key on a user's account.

According to another embodiment, the at least one stored random encryption key corresponds to the last file opened by the user.

According to another embodiment, the method further comprises the step of resizing the file system by: removing designated blocks from the plurality of random blocks to create a subset of random blocks; generating a new tail value using the XOR function with the random encryption key and the subset of random blocks as the XOR function inputs; appending the new tail value to the subset of random blocks; and reclaiming the storage space represented by the designated blocks.

According to another embodiment, the method further comprises the step of resizing the file system by: generating a new random blocks XOR result by using the XOR function with unused random blocks from the plurality of random blocks as the XOR function inputs; generating a new and existing random blocks XOR result using the XOR function with the new random blocks XOR result and the First XOR result; generating a new tail value using the XOR function with the new random blocks XOR result and the new and existing random blocks XOR result as the XOR function inputs; and appending the unused random blocks and the new tail value to the existing random blocks.

According to another embodiment, the method farther comprises the step of splitting the designated file into multiple sections to encrypt separately.

Another embodiment is directed to a method for deterring malicious network attacks. The method comprises: executing instructions on at least one of the processors to generate a pool of a plurality of random blocks; and computing the XOR result of random blocks in the pool of a plurality of random blocks using the XOR function.

According to another embodiment, the executing step is performed when the system is otherwise idle.

According to another embodiment, the method further comprises the steps of: executing instructions on at least one of the processors to select a pre-computed XOR result of random blocks; generating a tail value by using the XOR function with the pre-computed XOR result and a random encryption key as the XOR function inputs; encrypting the new designated file using the random encryption key; and appending the tail value and encrypted new designated file to the random blocks relating to the pre-computed XOR result.

Another embodiment is also directed to a method for deterring malicious network attacks. The method comprises writing a plurality of random blocks to different locations on one or more storage media; wherein each random block contains the location of the next random block to be read.

According to another embodiment, the one or more storage media is comprised of magnetic drives.

DETAILED DESCRIPTION OF EMBODIMENTS

Figure 1:
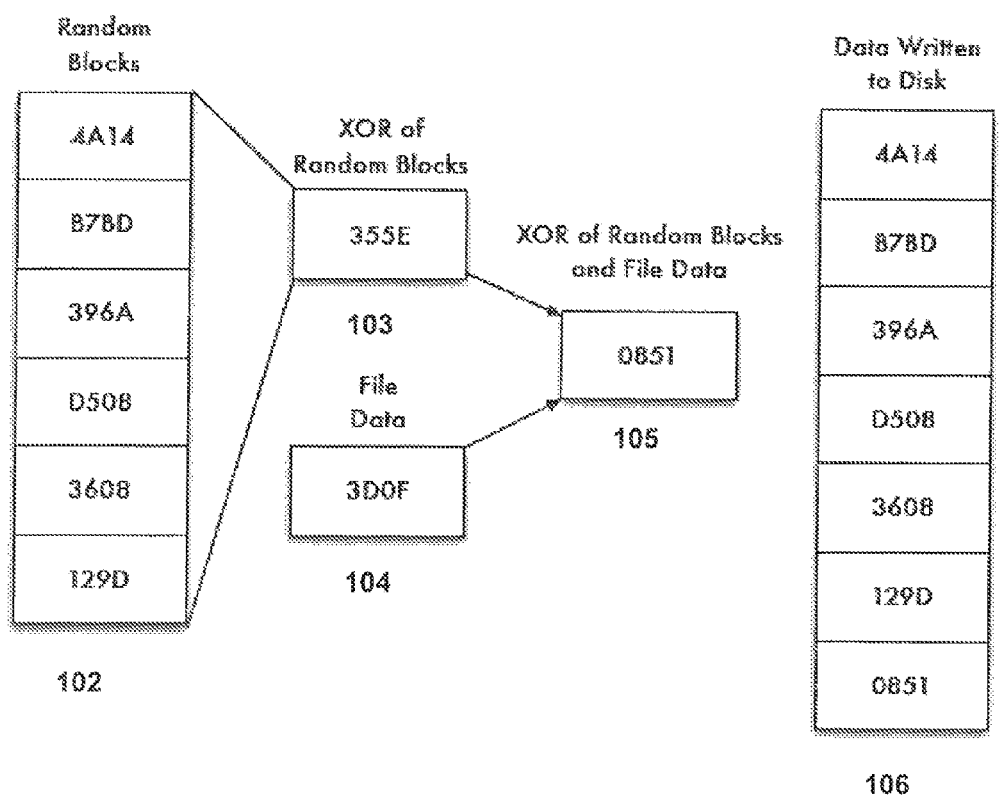
FIG. 1 depicts an exemplary diagram of a process for increasing the size of files in a system according to an embodiment.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments for illustration purposes and embodiments include the methods described and may be implemented using one or more apparatus, such as processing apparatus coupled to electronic media. Embodiments may be stored on an electronic media (electronic memory, (RAM), read-only memory (ROM), Electrically-Erasable Programmable Read-Only Memory (EEPROM), solid state memory, flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by the computer) or programmed as computer code (e.g., source code, object code or any suitable programming language) to be executed by one or more processors operating in conjunction with one or more electronic storage media.

Embodiments may be implemented using one or more processing devices, or processing modules. The processing devices, or modules, may be coupled such that portions of the processing and/or data manipulation may be performed at one or more processing devices and shared or transmitted between a plurality of processing devices.

Embodiments take advantage of the mismatch between increasing storage space in computer systems and the stagnant interface speed by which different hardware components transfer data in the system. For example, the ability to store data on magnetic drives is increasing rapidly. According to Kryder's law, areal storage density in magnetic drives doubles faster than every 18 months. The amount of data stored on a magnetic drive is therefore increasing exponentially. If Kryder's law holds true, magnetic drives will increase in size to a capacity of 10 TBs by 2014.

In contrast to the exponential increase in magnetic drive storage capacity, the transfer speed of the hardware interfaces with which a computer system's magnetic drives interact and transmit data to other computer system components has not experienced similar exponential growth. This is because hardware interfaces are typically built into computer hardware components and are not easily replaceable. Older computer hardware must be able to interface with newer components, such as new storage drives. New interface protocols with higher transfer speeds would render older computer hardware components obsolete, thus adoption of protocols generally maintain compliance with hardware components from previous generations, and new interface protocols are also adopted more slowly. Thus, there is a large and exponentially growing difference between magnetic storage capacity and the interface speeds used to transfer data from magnetic drives.

In an embodiment, system data files are expanded so that it physically takes a longer time for users to read data from the system's storage media. Hackers who attempt to mine sensitive data from a computer system are be faced with a physical bottleneck, which increases the amount of time necessary to read data from the system and transfer it to the hacker's private system. Remote hackers are unable to bypass the physical bottleneck because of the need to physically read an expanded file from the system's storage media. While normal system users may be penalized with slower file-access speeds, due to the fact that normal users only access a few files a day, the penalty would be minimal.

FIG. 1 depicts an exemplary diagram of a process for increasing the size of files in a system according to an embodiment. The computer system first generates a plurality of blocks of random data 102 that are written to the system's storage media. The system then uses the blocks of random data 102 as inputs for an "exclusive or" function ("XOR" function) on the blocks of random data 102 to generate a first XOR result. The first XOR result 103 and the original file 104 to be expanded are used as inputs for the XOR function. This generates a second XOR result 105. The system then writes data 106 including both the blocks of random data 102 that were used by the system to generate the first XOR result 103 and the second XOR result 105 to the system's storage media. As noted above, expansion of the file with the added data aids in protecting the data on the system from exfiltration by unauthorized users.

Figure 2:
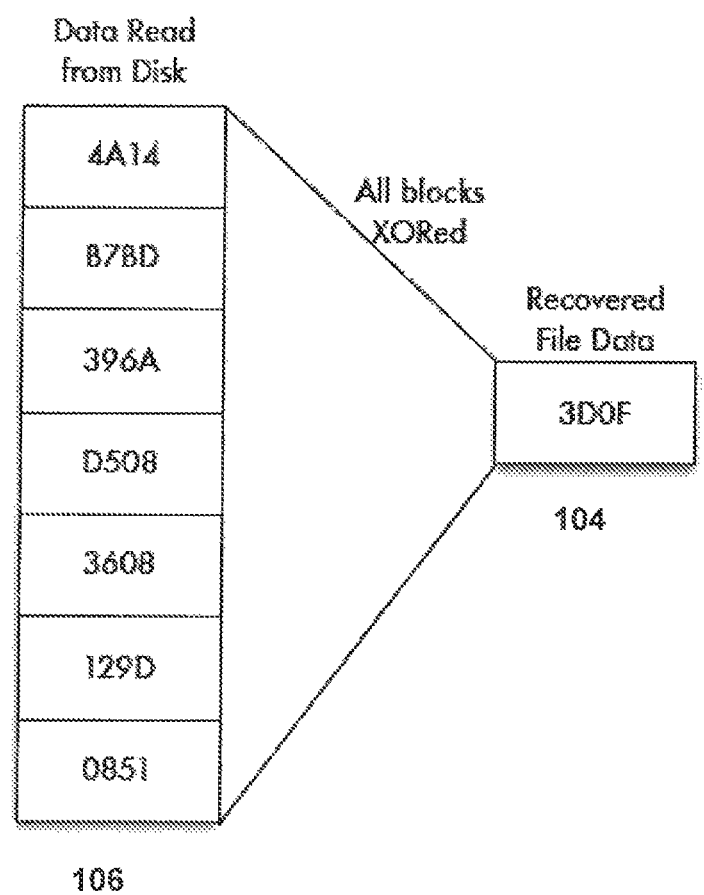
FIG. 2 depicts an exemplary diagram of a process for recovering data flies in a system according to an embodiment.

FIG. 2 depicts an exemplary diagram of a process for recovering data files in a system according to an embodiment. The system can recover the original data 104 of the expanded file by using the XOR function. To recover the data, the system accesses the location on the system's storage media where stored data 106 including the blocks of random data 102 that were used by the system to generate the first XOR result 103 and the second XOR result 105 were originally stored. Using the XOR function with the blocks of random data 102 that were used by the system to generate the first XOR result 103 and the second XOR result 105 as its inputs, the resulting file will be the original file data 104. The user can then read and write to the original data file without the system permanently altering the content of the file.

The process depicted in FIG. 1 and FIG. 2 deters the actions of hackers by slowing their access times to files on a system. To extract a data file, a hacker is forced to read every block of random data generated by the system and added to the original data file by the XOR function. Because the method relies on the physical act of reading blocks of data to slow a hacker down, the data files on the system are configured to deter a hacker even if the hacker to bypasses the other security measures through software exploits. Thus the penalty in speed for a normal user who accesses only a few files over the course of a session or workday is negligible, however for a malicious user, the ability to download a large number of files in a short period is effectively deterred.

In another embodiment, the system is configured to employ encryption to allow authorized users who need to access and use to large number of files to use the system. For example, the addition of an encryption component to the process allows administrators the ability to back up the entire file system without running into the physical bottleneck that restrains unauthorized users.

Figure 3:
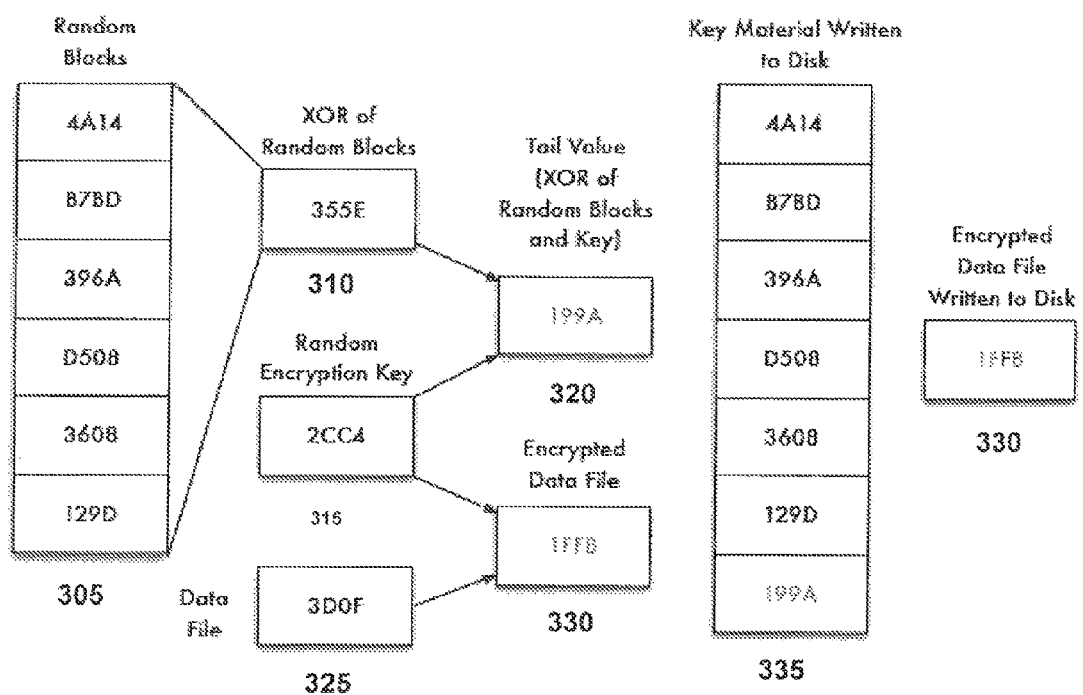
FIG. 3 shows an exemplary diagram of a process for increasing the size of files M a system using an encryption key according to an embodiment.

FIG. 3 shows an exemplary diagram of a process for increasing the size of files in a system using an encryption key according to an embodiment. The system first generates a plurality of blocks of random data 305. The system then uses the XOR function with the blocks of random data 305 as its inputs to generate a first XOR result 310. The first XOR result 310 is then used as an input in the XOR function along with a random encryption key 315 to generate a tail value 320. The random encryption key 315 is also used on the original data file 325 that needs to be expanded to generate an encrypted data file 330.

The random encryption key can be, but is not limited to, a security protocol such as the 256 bit Advanced Encryption Standard ("AES") security protocol. The tail value 320 is then appended to the blocks of random data 305 that were used to create the first XOR result 310. The system then writes the random blocks 305 with the appended tail value 320 as one block of material 335 to at least one storage medium in the system. The system also writes the encrypted data file 330 to at least one storage medium.

Figure 4:
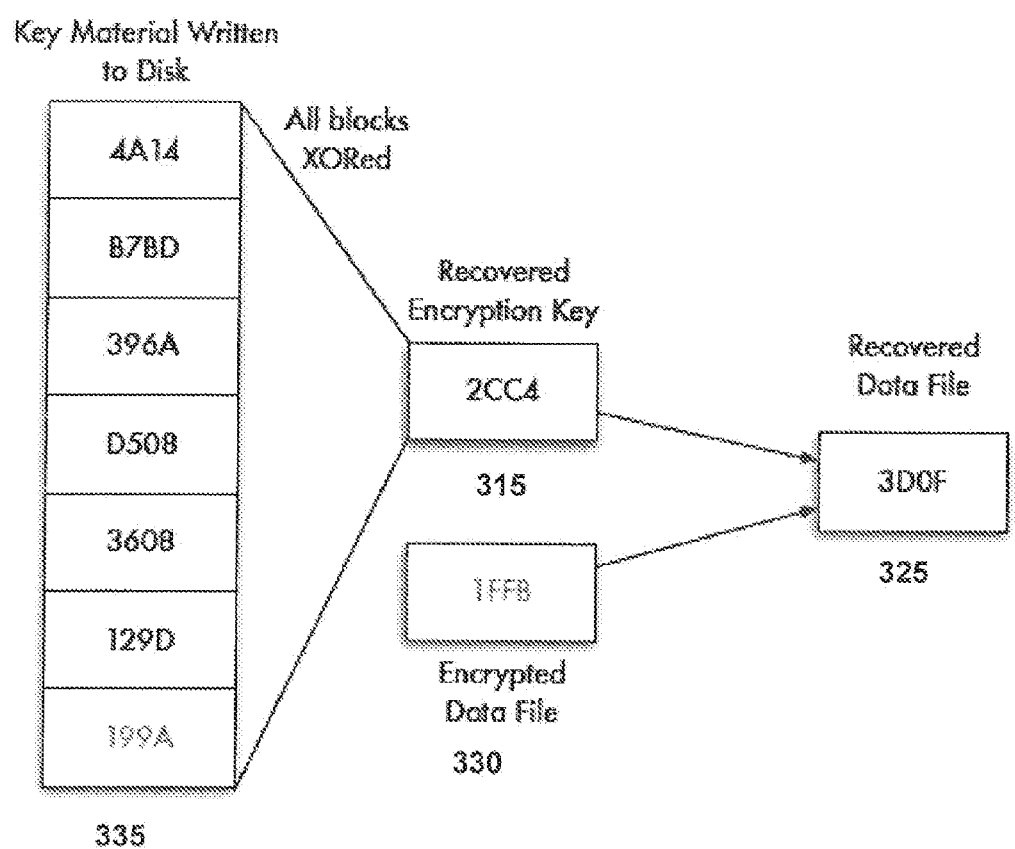
FIG. 4 shows an exemplary diagram of a process for recovering data files in a system using an encryption key according to an embodiment.

According to an embodiment, the original data file is not expanded, but rather the encryption key used on the original data file is expanded. Therefore, if a user already has the encryption key for a particular file, the user does not have to read all the random blocks that have been added to the encryption key by the system using the XOR function. However, if a user does not have the encryption key, the user must recover the key from the system in order to read the original file. FIG. 4 shows an exemplary diagram of a process for recovering data files in a system using an encryption key according to an embodiment. To recover and read the expanded data file, the system must first locate the blocks of random data with the appended tail value 335 on the system's storage media. The system then uses the XOR function on the blocks of random data with the appended tail value 335 to recover the encryption key 315. Once the encryption key 315 is recovered, the system can decrypt the encrypted data file 330 to recover the original data file 325, which can then be read and manipulated by the user.

According to an embodiment, the random encryption keys can be cached in a user's account. By caching random encryption keys, the system can allow some users to bypass the long read times that are required to read the key material. Therefore, the only increase in access time for users would be the time it takes to decrypt the original data file, which is only limited by the speed of the system's processor and does not face the same physical bottlenecks are the read speeds of the system's storage media interfaces.

According to an embodiment, the system can be configured to cache random encryption keys on a user's account corresponding to a user's most recent opened files. Thus, typical users will face the negligible efficiency penalty while waiting for the original data file to be decrypted by the system when working with their most recent files. In an embodiment, the system may also be configured to allow keys to periodically expire front a user's cache.

Further, if a hacker obtains a user's access credentials, the hacker would only be able to remove the most recent files the user had been working on without facing the physical bottleneck. Because most malicious hackers employ a strategy that removes the largest possible amount of data from a system at once and allows the malicious hacker sift through the data to discover information at a later time on a private system, this embodiment frustrates the ability to do so by maintaining the physical bottleneck on a vast majority of files on the system.

According to another embodiment, the key caching technique can be used by administrators to back up the files on a system without encountering the physical bottleneck used to deter malicious attacks. Normally, an administrator who performs a back up of an entire file system will have an access pattern that is very similar to a hacker's access pattern because the administrator needs to access every file on the system for back up purposes. The administrator would then run into the same physical bottleneck as a hacker, and would be forced to read every random block to recover the encryption key necessary to decrypt the original data file that needs to be backed up. Thus, the system can be configured to allow administrators to bypass the physical bottleneck in such a way that a malicious hacker cannot duplicate.

In an embodiment, when the system creates the random encryption key to encrypt the original file, the system can further encrypt the random key with a public key held by the administrator account. The administrator can then decrypt any random encryption key and use the random key to decrypt the original file for back up. To decrypt the random encryption key, a user such as the administrator needs to have access to the public key's corresponding private key. To ensure that a malicious hacker cannot readily duplicate the administrator's bypass method, access to the private key can be based on physical presence at the system. Physical presence can be determined through the use of physical objects such as, but not limited to, hardware tokens or portable memory devices such as USB sticks that contain the private key. Further, physical presence can be determined by direct console access on the system.

According to an embodiment, the system can improve the time at which files are written to the system by pre-computing blocks of random data in advance. A user who writes a file on the system may have to wait for the system to generate and write the blocks of random data. To prevent this, the system can pre-compute a sufficient number of random blocks before the user needs to use them to write a file. The system can also pre-compute the XOR results of the random blocks using different permutations of the random blocks.

Figure 4A:
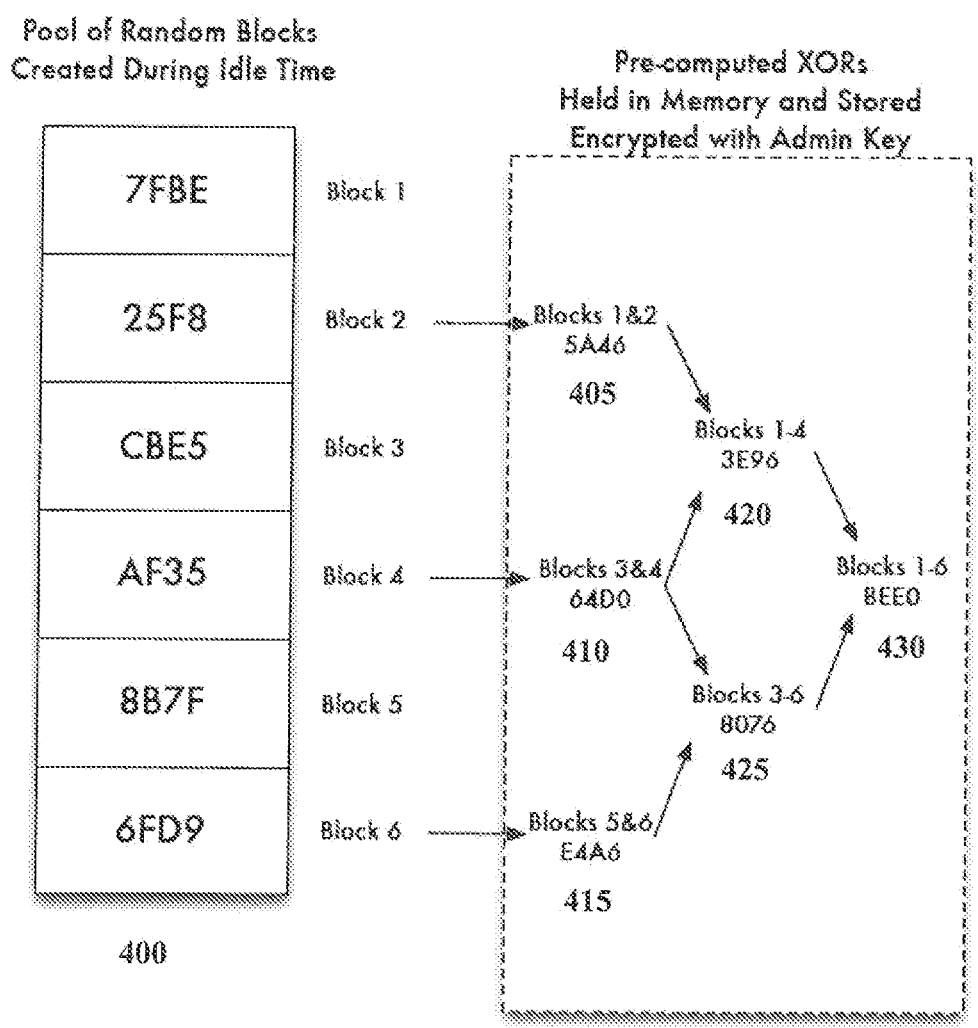
FIG. 4A depicts an exemplary process for precomputing permutations of random blocks.

FIG. 4A depicts an exemplary process for pre-computing permutations of random blocks. According to an embodiment, the system creates a pool of random blocks of data 400. For example, the pool of random blocks 400 may contain six pre-generated random blocks. To improve the system's file-write time, the system can pre-compute the XOR results for each of the six pre-generated blocks. For example, the system can pre-compute the XOR result of the first two blocks 405 as the XOR function's inputs, as well as the XOR result of the third and fourth blocks 410 and the XOR result of the fifth and sixth blocks 415.

According to an embodiment, the system can use the XOR results of the first and second blocks 405 and the XOR result of the third and fourth blocks 410 to create the XOR result of blocks one through four 420. The XOR result of all six blocks 430 can be pre-computed using the XOR result of blocks one through four 420 and the XOR result of blocks three through six 425. Depending on the needs of the system, the system can select the pre-computed XOR result of the exact number of blocks necessary to write a file to a storage medium from the pool of pre-computed XOR results 435. By using different permutations of XOR results, the system can use any number of random blocks when writing a file to a storage media instead of relying on certain numbers of pre-computed blocks. When a new file is written, the system can assign a set containing the exact number of random blocks necessary to add to the random encryption key for that data file. By using different permutations, the system can use any number of random blocks when writing a file to a storage media instead of relying on certain numbers of pre-computed blocks. When a new file is written, the system can assign a set containing the exact number of random blocks necessary to add to the random encryption key for that data file. In this embodiment, the system can designate the pre-computed random blocks as unreadable to the normal user. By making the block unreadable, a compromised user account will not be able to pre-compute XOR results and eliminate part of the physical bottleneck during a malicious attack.

According to an embodiment, the system may need to adjust the size of expanded files on the fly. Because the system must increase the file size of all files on the system to create the physical bottleneck in hardware interfaces to deter malicious attacks, there is a risk that the files can become too large. If files on the system are too large, they will take too long to read for normal users, whereas if the files are too small, malicious hackers will not be delayed enough to deter the malicious attacks. The capacity of the storage media on the system may also limit the size that files can be expanded to. Thus, the system may need to adjust the size of the files based on the required read times for users and the drive space available for the files.

Figure 5:
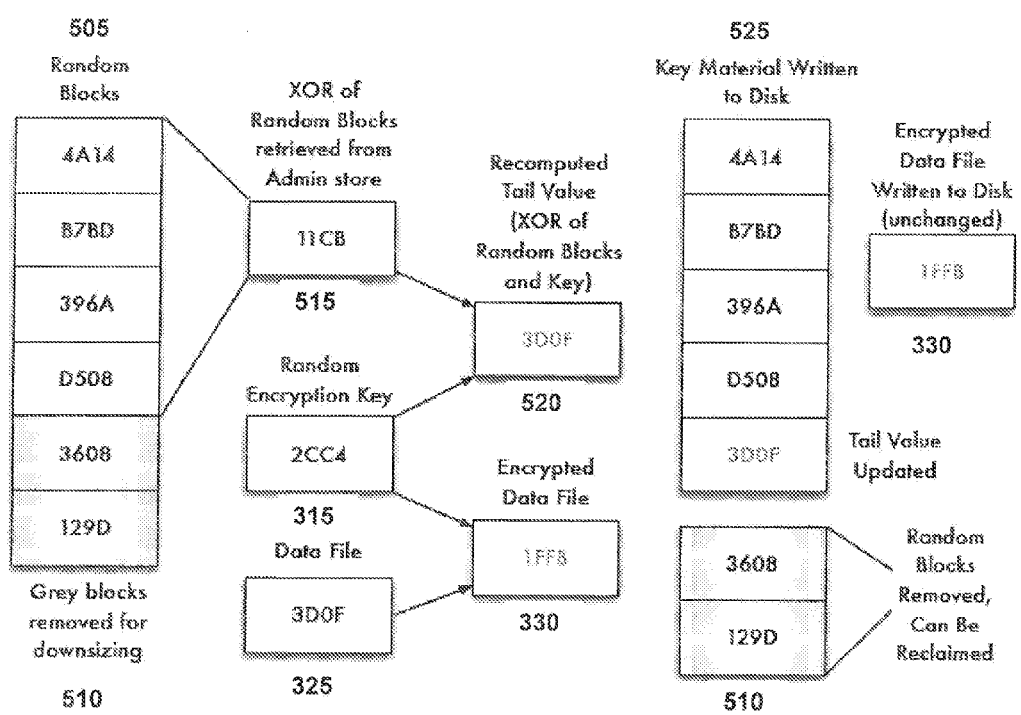
FIG. 5 depicts an exemplary diagram of a process for downsizing a file system according to an embodiment.

According to an embodiment, when the storage media on the system approach full capacity, the system can be configured to quickly resize the expanded files so that the files take up less space on the storage media. FIG. 5 depicts an exemplary diagram of a process for downsizing a the system according to an embodiment. The system first determines, based on the original expanded file, how many random blocks 360B, 129D need to be removed from the plurality of random blocks that were used to generate the first XOR result 510. Removing random blocks 360B, 129D from the original plurality of random blocks creates a new subset of random blocks 505. Using the pre-computed XOR result 515 that the system had previously generated based on the subset of random blocks, the system uses the XOR function again with the pre-computed XOR result 515 and the random encryption key 315 as its inputs to create a recomputed tail value 520. The system only needs to readjust the size of the expanded key file and does not have to reencrpyt the original data file 325. Further, in this embodiment, the random blocks that have been designated for removal 360B, 129D can be reclaimed by the system and used for additional storage. Finally, the system appends the recomputed tail value 520 to the subset of random blocks 505 and writes the combined data 525 to at least one storage medium. The encrypted data file 330 remains written on at least one storage medium, unchanged by the resizing operation.

Figure 6:
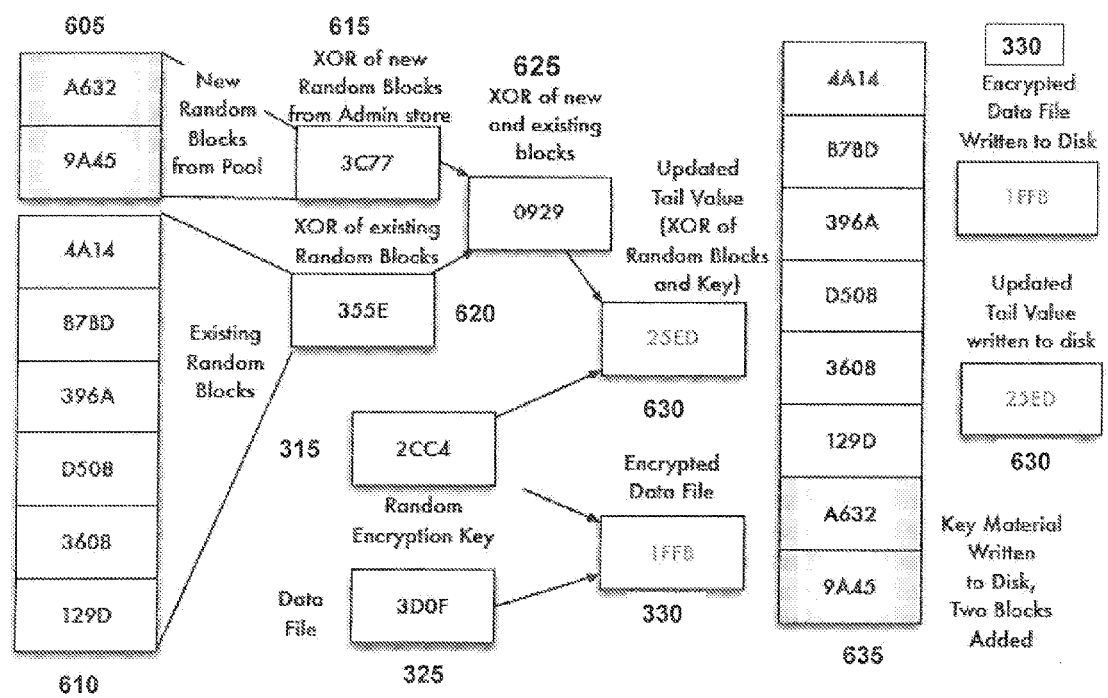
FIG. 6 depicts an exemplary diagram of a process for upsizing a file system according to an embodiment.

Similarly, according to an embodiment, the system can also be configured to increase size of expanded files on the fly, for example if the system determines that the read times are insufficient to prevent malicious network attacks from hackers, or otherwise determines it has the capacity to increase file size without undue adverse penalty to normal users. FIG. 6 depicts an exemplary diagram of a process for upsizing a file system according to an embodiment. The system first determines the number of pre-computed random blocks 605 that need to be added to an expanded file to effectively deter hackers. The system then pulls the necessary number of pre-computed random blocks 605 from the pool of pre-computed random blocks and also locates the pre-computed random blocks' 605 corresponding XOR result 615. Using the XOR function, the system inputs the XOR result of the new pre-computed random blocks 615 and the XOR result 620 of the existing random blocks 610 to generate a new XOR result of new and existing random blocks 625. The system then once again uses the XOR function with the XOR result of new and existing blocks 625 and the random encryption key 315 to generate an updated tail value 630. Again, the original data file 325 does not need to be reencrypted and the encrypted result 330 does not need to be removed from its original location on the at least one storage medium. The new pre-computed random blocks 605 are then appended to the existing random blocks 610. The updated tail value 630 is then appended to the combined new and existing random blocks 635 and written to at least one storage medium. The encrypted data file 330 remains written on at least one storage medium, unchanged by the resizing operation.

According to an embodiment, malicious network attacks can be further prevented by using the physical speed restraints of a magnetic drive's read head. A magnetic drive uses a read head that is located on a moveable arm to move cross the disk and locate files. The read head can read contiguous data located on a disk very quickly, as it can read a stripe of data located on the disk in one pass without moving the moveable arm. However, data written to different locations on a disk requires that the moveable arm move across the disk and thus the read time increases. This mechanism can be used as part of the physical bottleneck to deter hackers.

In an embodiment, the system can write many separate series of random blocks in different locations on at least one storage medium. Each series of random blocks can contain random values and data, as well as a location for the next series of blocks to be read. Therefore, to read the entire data file, the magnetic drive's read head must move around often between blocks.

A system that relies on solid state drives exclusively would not have the physical bottleneck contained in a magnetic drive's read head. However, according to one embodiment, a magnetic drive can be added to the system to be used in combination with the solid state drive. The magnetic drive can store the series of random blocks while all encrypted file data is on the solid state drive. This embodiment allows the physical bottleneck to exist when recovering the random encryption keys, but allows users and administrators to use encryption keys stored in the local caches to access the data files on the solid state drives much quicker than before.

In some instances, computer programs may report time out errors should data they try to read from the system not arrive quickly enough due to the increased read times caused by the physical bottleneck. According to one embodiment, the system can be configured to split the original data file into multiple sections. Each section can then be encrypted separately with a distinct random encryption key. Each distinct random encryption key can be expanded individually to ensure an adequate physical bottleneck remains to prevent malicious attacks. This embodiment ensures that data files from the system do not create time out errors as individual pieces of the data files will arrive piecewise, placating the computer program's time out clock.

Example Computing Environment

Figure 7:
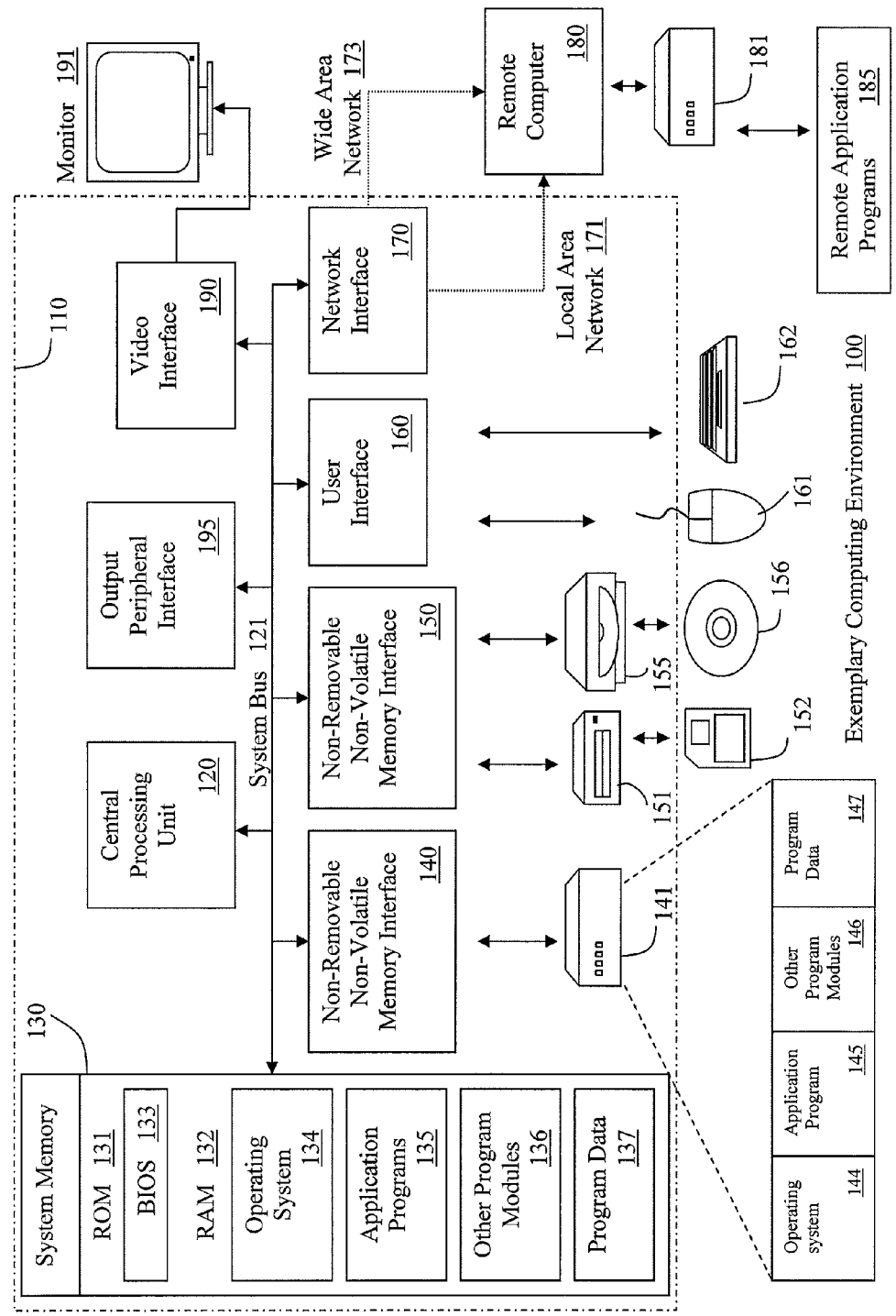
FIG. 7 is a schematic diagram of an exemplary computing environment.

FIG. 7 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use With the invention include, but are not limited to, personal computers (PCs), server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 7 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or a combination of components illustrated in the exemplary operating environment 100.

With reference to FIG. 7, an example system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), and PCI-Express bus.

The computer 110 typically includes a variety of computer readable media. Computer readable media can be any available media that can be accessed by the computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by the processing unit 120. By way of example, and not limitation, FIG. 7 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 7 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 7 provide storage of computer readable instructions, data structures, program modules and other data for the computer 110. In FIG. 7, for example, the hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, touch pad. Other input devices (not shown) may include a microphone, joystick, game pad, satellite dish, scanner, or the like. A monitor 191 or display may also include touch screen capability for input. These and other input devices are often connected to the processing unit 120 through a user input interlace 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers and a printer (not shown), which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 7. The logical connections depicted in FIG. 7 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes means for establishing communications over the WAN 173, such as the Internet. In a networked environment, program modules depicted relative to the computer 110, or portions thereof, may be stored in the remote memory storage device. By way of example, and not limitation, FIG. 7 illustrates remote application programs 185 as residing on a memory device 181. Remote application programs 185 include, but are not limited to web server applications such as Microsoft®

Internet Information Services (IIS)® and Apache HTTP Server which provides content which resides on the remote storage device 181 or other accessible storage device to the World Wide Web. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Example Network Environment

Figure 8:
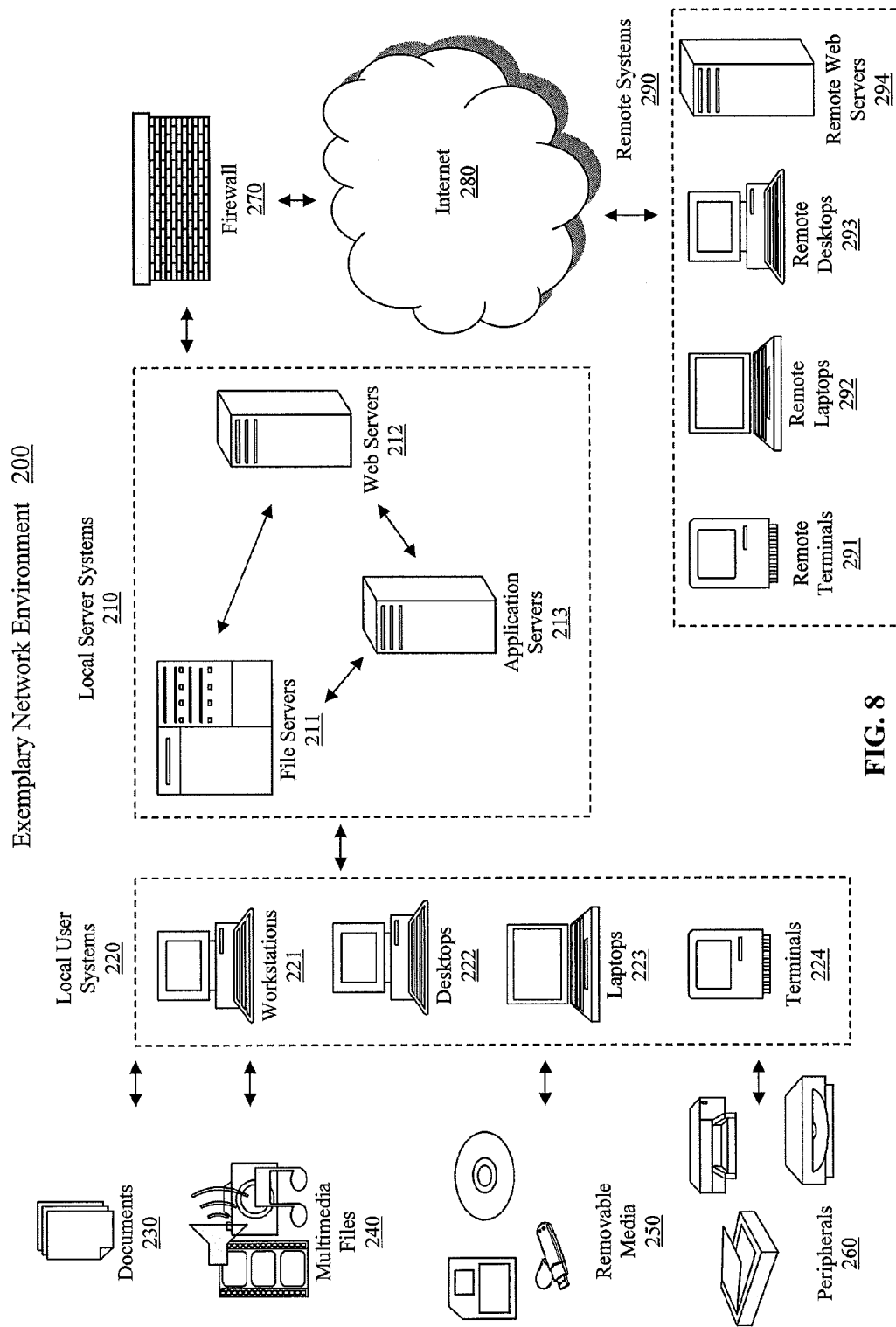
FIG. 8 is a schematic diagram of an exemplary network environment.

FIG. 8 illustrates an embodiment of a network environment in which an embodiment of the present invention can be implemented. The network environment 200 contains a number of local server systems 210, which may include a number of file servers 211, web servers 212, and application servers 213 that are owned and managed by the owner of the local network. These servers are in communication with local user systems 220 which may include a large variety of systems such as workstations 221, desktop computers 222, laptop computers 223, and thin clients or terminals 224. The local user systems 220 may contain their own persistent storage devices such as in the case of workstations 221, desktop computers 222, and laptop computers 223. They can also have access to the persistent storage provide by the local servers 210. In the case of thin clients and terminals 224, network storage may be the only available persistent storage. The local user systems are usually connected to a variety of peripherals 260 that handle data input and output, such as scanners, printers and optical drives. There may also be a number of different kinds of removable media 250 that attach to the user systems 220 at times. These removable media 250 can be based on magnetic recording, such as floppy disks and portable hard drives, or be based on optical recording, such as compact disks or digital video disks. Further, removable media can also be based on non-volatile memory such as flash memory which can be a USB flash drive, and all forms of flash memory cards. The users within the local network usually get access to the wider area network such as the Internet 280 though the local server systems 210 and typically some network security measures such as a firewall 270. There might also be a number of remote systems 290 that can be in communication with the local server systems 210 and also the local user systems 220. The remote computer systems can be a variety of remote terminals 291, remote laptops 292, remote desktops 293, and remote web servers 294.

FIG. 8 illustrates an exemplary network environment. Those of ordinary skill in the art will appreciate that the teachings of the present invention can be used with any number of network environments and network configurations.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings provided herein, one of ordinary skill in the related art will be able to contemplate these and similar implementations or configurations.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit. Although illustrative embodiments have been described in detail herein with reference to the accompanying drawings, it is to be understood that the invention is not limited to those precise embodiments, and that various changes and modifications can be effected therein by one skilled in the art without departing from the scope and spirit as defined by the appended claims.

The invention claimed is:

1. A computerized method for deterring malicious network attacks, the method being performed by a computer system that comprises one or more processors and one or more storage media operatively coupled to at least one of the processors, the method comprising:
   executing instructions on at least one of the processors to generate a plurality of random blocks of data;
   generating a first XOR result by using an XOR function with the plurality of random blocks of data as the XOR function inputs;
   generating a tail value by using the XOR function with the first XOR result and a random encryption key as the XOR function inputs;
   encrypting a designated file using the random encryption key;
   writing the plurality of random blocks and the tail value to the at least one storage medium;
   writing the encrypted designated file to the at least one storage medium; and
   resizing including:
      removing designated blocks from the plurality of random blocks to create a subset of random blocks;
      generating a new tail value using the XOR function with the random encryption key and the subset of random blocks as the XOR function inputs; and
      appending the new tail value to the subset of random blocks.

2. The method of claim 1, further comprising:
   recovering the random encryption key by using the XOR function with the tail value and the plurality of random blocks as the XOR function inputs; and
   decrypting the designated file using the recovered random encryption key.

3. The method of claim 1, wherein the random encryption key uses 256 bit ABS security protocol.

4. The method of claim 1, further comprising:
encrypting the random encryption key with a public key, wherein the public key has a corresponding private key and the corresponding private key is held by an administrator account.

5. The method of claim 4, wherein access to the private key is based on physical presence at the system.

6. The method of claim 5, wherein physical presence is authenticated by direct console access.

7. The method of claim 5, wherein physical presence is authenticated by a hardware token.

8. The method of claim 5, wherein physical presence is authenticated by a private key stored on portable memory device.

9. The method of claim 1, further comprising:
associating at least one random encryption key with a user's account.

10. The method of claim 9, wherein the at least one random encryption key corresponds to the last file opened by the user.

11. The method of claim 1, further comprising:
reclaiming the storage space represented by the designated blocks.

12. The method of claim 1, further comprising:
splitting the designated file into multiple sections to separately encrypt the sections.

13. A computerized method for deterring malicious network attacks, the method being performed by a computer system that comprises one or more processors and one or more storage media operatively coupled to at least one of the processors, the method comprising:
execute instructions on at least one of the processors to generate a pool of a plurality of random blocks;
computing the XOR result of random blocks in the pool of a plurality of random blocks using the XOR function;
executing instructions on at least one of the processors to select a pre-computed XOR result of random blocks;
generating a tail value by using the XOR function with the pre-computed XOR result and a random encryption key as the XOR function inputs;
encrypting a designated file using the random encryption key; and
appending the tail value and encrypted designated file to the random blocks relating to the pre-computed XOR result.

14. The method of claim 13, wherein the executing is performed when the system is idle.

15. A computer system for deterring malicious network attacks, the computer system comprising:
one or more processors;
one or more interfaces operatively coupled to at least one of the processors; and
one or more computer-readable storage media operatively coupled to at least one of the processors and encoded with instructions that, when executed by at least one of the processors, cause the computer system at least to:
execute instructions on at least one of the processors to generate a plurality of random blocks of data;
generate a first XOR result by using the XOR function with the plurality of random blocks of data as the XOR function inputs;
generate a tail value by using the XOR function with the first XOR result and a random encryption key as the XOR function inputs;
encrypt a designated file using the random encryption key;
write the plurality of random blocks and tail value to at least one storage medium; and
write the encrypted designated file to at least one storage medium;
resize by:
removing designated blocks from the plurality of random blocks to create a subset of random blocks;
generating a new tail value using the XOR function with the random encryption key and the subset of random blocks as the XOR function inputs;
appending the new tail value to the subset of random blocks; and
reclaiming storage space represented by the designated blocks.

16. The computer system of claim 15, further comprising instructions that cause the computer system at least to
recover the random encryption key by using the XOR function with the tail value and the plurality of random blocks as the XOR function inputs; and
decrypt the designated file using the recovered random encryption key.

17. The computer system of claim 15, wherein the random encryption key uses 256 bit AES security protocol.

18. The computer system of claim 15, further comprising instructions that cause the computer system at least to
encrypt the random encryption key with a public key, wherein the public key has a corresponding private key and the corresponding private key is held by an administrator account.

19. The computer system of claim 18, wherein access to the private key is based on physical presence at the system.

20. The computer system of claim 19, wherein physical presence is authenticated by direct console access.

21. The computer system of claim 19, wherein physical presence is authenticated by a hardware token.

22. The computer system of claim 19, wherein physical presence is authenticated by a portable memory device comprising the private key.

23. The computer system of claim 15, further comprising instructions that cause the computer system at least to
store at least one random encryption key on a user's account.

24. The computer system of claim 23, wherein the at least one stored random encryption key corresponds to the last file opened by the user.

25. The computer system of claim 15, further comprising instructions that cause the computer system at least to
split the designated file into multiple sections to separately encrypt the sections.

26. A computer system for deterring malicious network attacks, the computer system comprising:
one or more processors;
one or more interfaces operatively coupled to at least one of the processors; and
one or more computer-readable storage media operatively coupled to at least one of the processors and encoded with instructions that, when executed by at least one of the processors, cause the computer system at least to:
execute instructions on at least one of the processors to generate a pool of a plurality of random blocks;
compute the XOR result of random blocks in the pool of a plurality of random blocks using the XOR function;
execute instructions on at least one of the processors to select a pre-computed XOR result of random blocks;

generate a tail value by using the XOR function with the pre-computed XOR result and a random encryption key as the XOR function inputs;

encrypt a designated file using the random encryption key; and append the tail value and the encrypted designated file to the random blocks relating to the pre-computed XOR result.

27. The computer system of claim 26, wherein the executing step is performed when the system is idle.

28. The computer system of claim 26, wherein the one or more storage media is comprised of magnetic drives.

29. A computerized method for deterring malicious network attacks, the method being performed by a computer system that comprises one or more processors and one or more storage media operatively coupled to at least one of the processors, the method comprising:

executing instructions on at least one of the processors to generate a plurality of random blocks of data;

generating a first XOR result by using an XOR function with the plurality of random blocks of data as the XOR function inputs;

generating a tail value by using the XOR function with the first XOR result and a random encryption key as the XOR function inputs;

encrypting a designated file using the random encryption key;

writing the plurality of random blocks and the tail value to the at least one storage medium; and writing the encrypted designated file to the at least one storage medium;

resizing by:

generating a new random blocks XOR result by using the XOR function with unused random blocks from the plurality of random blocks as the XOR function inputs;

generating a new and existing random blocks XOR result using the XOR function with the new random blocks XOR result and the first XOR result;

generating a new tail value using the XOR function with the new random blocks XOR result and the new and existing random blocks XOR result as the XOR function inputs; and appending the unused random blocks and the new tail value to the existing random blocks.

30. A computer system for deterring malicious network attacks, the computer system comprising:

one or more processors;

one or more computer-readable storage media operatively coupled to at least one of the processors and encoded with instructions that, when executed by at least one of the processors, cause the computer system at least to:

execute instructions on at least one of the processors to generate a plurality of random blocks of data;

generate a first XOR result by using the XOR function with the plurality of random blocks of data as the XOR function inputs;

generate a tail value by using the XOR function with the first XOR result and a random encryption key as the XOR function inputs;

encrypt a designated file using the random encryption key;

write the plurality of random blocks and tail value to at least one storage medium;

write the encrypted designated file to at least one storage medium;

generating a new random blocks XOR result by using the XOR function with unused random blocks from the plurality of random blocks as the XOR function inputs;

generating a new and existing random blocks XOR result using the XOR function with the new random blocks XOR result and the first XOR result;

generating a new tail value using the XOR function with the new random blocks XOR result and the new and existing random blocks XOR result as the XOR function inputs; and appending the unused random blocks and the new tail value to the existing random blocks.

* * * * *